(12) United States Patent
Joseph (10) Patent No.: US 8,601,808 B1
(45) Date of Patent: Dec. 10, 2013

(54) HYDROKINETIC AND WIND ENERGY HARVESTER

(71) Applicant: Erat S. Joseph, Baton Rouge, LA (US)

(72) Inventor: Erat S. Joseph, Baton Rouge, LA (US)

(*) Notice: Subject to any disclaimer, the term of this patent is extended or adjusted under 35 U.S.C. 154(b) by 0 days.

(21) Appl. No.: 13/694,085

(22) Filed: Oct. 30, 2012

Related U.S. Application Data (60) Provisional application No. 61/631,381, filed on Dec. 31, 2011.

(51) Int. Cl.
*F03B 17/02* (2006.01)
*F03B 13/18* (2006.01)
*H02P 9/04* (2006.01)

(52) U.S. Cl.
USPC .................. 60/506; 60/495; 60/499; 60/502; 290/42; 290/53

(58) Field of Classification Search
USPC ........................... 60/495–507; 290/42, 43, 53
See application file for complete search history.

(56) References Cited

U.S. PATENT DOCUMENTS

| | | |
|---|---|---|
| 3,687,567 A | 8/1972 | Lininger |
| 3,746,875 A | 7/1973 | Donatelli |
| 4,319,454 A | 3/1982 | Lucia |
| 4,392,060 A | 7/1983 | Ivy |
| 4,447,740 A | 5/1984 | Heck |
| 4,467,218 A | 8/1984 | Andruszkiv et al. |
| 4,661,716 A | 4/1987 | Chu |
| 4,719,754 A | 1/1988 | Nishikawa |
| 4,818,888 A | 4/1989 | Lenoir, III |
| 5,005,357 A | 4/1991 | Fox |
| 5,244,359 A | 9/1993 | Slonim |
| 5,549,445 A | 8/1996 | Schremp |
| 6,109,863 A | 8/2000 | Milliken |
| 6,194,791 B1 * | 2/2001 | Wells .............................. 290/53 |
| 6,269,636 B1 | 8/2001 | Hatzilakos |
| 6,559,552 B1 * | 5/2003 | Ha .................................. 290/54 |
| 7,327,049 B2 | 2/2008 | Hamburg |
| 7,963,112 B1 * | 6/2011 | Joseph ............................ 60/499 |

* cited by examiner

*Primary Examiner* — Thomas E. Denion
*Assistant Examiner* — Brian Inacay (57) ABSTRACT

In accordance with the present invention, a Hydrokinetic & Wind Energy Harvester, placed in a wave-swash zone or in a flowing stream captures energy through water turbines and a wind turbine. A funnel guides water to converge and impinge on water turbines housed in a pipe. A trash guard attached to the funnel prevents trash from entering the pipe. A rotational transmission-system with one-way clutches transmits torque to an alternator to generate electricity. Flywheels maintain steady rotation of alternator shaft. A buoyancy chamber at the bottom produces reduction of weight of the unit in water, thereby enhances maneuverability of unit in water. Stabilization tank at the top when filled with water provides extra weight and stability against sliding and overturning of the unit in its operating location. An energy farm combines the energy of several units linked together; in coastal water, units form a seawall-like barrier mitigating coastal erosion.

17 Claims, 6 Drawing Sheets

Hydrokinetic & Wind Energy Harvester
(Perspective View showing Water Funnel, Pipe, Water Turbines, and Gear System with Flywheel)

Figure 5

LEFT VIEW
Illustration Showing Streamflow Entering Water Funnel

Figure 6

HYDROKINETIC AND WIND ENERGY HARVESTER

RELATED APPLICATIONS

The present patent application for HYDROKINETIC & WIND ENERGY HARVESTER is a continuation-in-part application of: United States continuation-in-part provisional patent application Ser. No. 61/631,381 for HYDROKINETIC & WIND ENERGY HARVESTER filed on Dec. 31, 2011, United States continuation-in-part patent application Ser. No. 13/068,532, filed on May 14, 2011 for PORTABLE WAVE-SWASH & COASTAL-WIND ENERGY HARVESTER, and United States Patent U.S. Pat. No. 7,963,112 B1 dated Jun. 21, 2011 for PORTABLE WAVE-SWASH & COASTAL-WIND ENERGY HARVESTER, Inventor Erat S. Joseph, included by reference herein and for which benefit of the priority date is hereby claimed.

BACKGROUND OF THE INVENTION

1. Field of the Invention

The present invention relates to the capturing of the energy contained in a combination of coastal waves and wind, as well as in a combination of streamflows and wind.

2. Background

The following is a tabulation of some prior art that presently appears relevant U.S. Patents

| Pat. No. | Date of Patent | Patentee |
| --- | --- | --- |
| 3,687,567 | Apr. 29, 1972 | William C. Lininger |
| 4,319,454 | Mar. 16, 1982 | Louis V. Lucia |
| 4,392,060 | Jul. 5, 1983 | Jessie T. Ivy |
| 4,719,754 | Jan. 19, 1988 | Kochi Nishikawa |
| 5,005,357 | Apr. 9, 1991 | Mansel F. Fox |
| 5,244,359 | Sep. 14, 1993 | David M. Slonim |
| 5,549,445 | Aug. 27, 1996 | Edward J. Schremp |
| 6,109,863 | Aug. 29, 2000 | Larry D. Milliken |
| 6,269,636 | Aug. 7, 2001 | Constantinos Hatzilakos |
| 6,559,552 | May 6, 2003 | Siu Kwong Ha |
| 7,327,049 | Feb. 5, 2008 | Ron Hamburg |
| 4,447,740 | May 1984 | Heck, Louis J. |
| 4,467,218 | August 1984 | Andruszkiw et al |
| 4,818,888 | April 1989 | Lenoir, III, James L. |
| 4,661,716 | April 1987 | Chu, Chun T. |
| 3,746,875 | July 1973 | Donatelli, Joseph |
| 6,194,791 | February 2001 | Wells, Alan Arthur |
| 7,963,112 | June 2011 | Joseph, Erat S. |

Past inventions have utilized essentially the following devices to capture energy from ocean waves, streamflows and wind: water wheels, wind wheels, and floats. Water wheels and wind wheels are designed to rotate, while floats are designed to move up and down on the water surface. Wave energy can be derived from the up and down motion of deep sea waves or from the flow of water in the wave-swash zone or in a stream. This invention utilizes the kinetic energy contained in wave-swash or in streamflow combined with the energy contained in wind.

U.S. Pat. No. 3,687,567, U.S. Pat. No. 4,719,754, U.S. Pat. No. 5,005,357, U.S. Pat. No. 5,244,359, and U.S. Pat. No. 6,109,863 do not utilize the force of wind to extract power.

U.S. Pat. No. 4,319,454, U.S. Pat. No. 4,392,060, U.S. Pat. No. 6,269,636 B1, and U.S. Pat. No. 7,327,049 B2, utilize only floats to extract energy. They do not utilize the action of water wheel or the force of wind to generate power.

U.S. Pat. No. 6,559,552 B1, is designed to capture energy from rain, wind, wave, and solar. It utilizes a water wheel and a wind wheel. The description states, "The turntable is rotated on bearings over a fixed-horizontal base plate, until the set-up is facing the wind and waves directly to the best advantage." One of the deficiencies of the apparatus is due to the fact that the directions of wind and wave do not necessarily match, and while the horizontal-axis wind wheel will not work unless its orientation changes to face the wind, a water wheel will not work unless it faces water flow.

U.S. Pat. No. 5,549,445 utilizes sea going platforms, wind energy conversion, and subsurface wave energy removing means. It is not designed for operation in the wave-swash zone.

None of the above mentioned patents includes any device to assist in the retention of angular momentum for maintaining sustained rotational energy.

None of the above mentioned patents includes any device that has the versatility to operate in wave-swash as well as in streamflows and thereby harness energy in waves as well as in streamflows.

Among nature's energy sources, wind, sea waves, and streamflows are prominent. Despite the fact that abundant energy is available in sea waves, flowing streams, and in wind, capturing of this energy economically from these sources remains a technological challenge.

One of the major drawbacks of wind mill technology lies in its very low capacity factor—the ratio of the power actually produced to the power that would have been produced if the turbines operated 100% of the time. Wind stops frequently, and consequently, standard wind mills typically have a capacity factor of only about 35%. Standard wind mills are huge in size, and are economically not feasible. One of the difficulties faced by wave turbine technology is due to the periodic nature of the occurrence of the waves and the resulting variability of torque produced by wave turbines. The present invention addresses these problems.

SUMMARY OF THE INVENTION

In accordance with the present invention, a hydrokinetic & wind energy harvester, once placed in coastal waters in the wave-swash zone or in a flowing stream generates electricity. It is equipped with water turbines, a wind turbine, a rotational transmission-system complemented by a flywheel, a buoyancy chamber, a stabilization tank, and an alternator.

It operates in coastal waters as well as in flowing streams and captures the united hydrokinetic power and wind power. Thus, it can operate as a wave-wind combination unit in a wave-swash zone in coastal waters, or as a streamflow-wind combination in a flowing stream.

Many unique hydrodynamic features of the design enable the optimization of the energy extraction process.

A funnel receives the flowing water, and guides and converges water toward a pipe to which it is attached.

The pipe placed with its longitudinal axis parallel to the direction of the flow receives the water from the funnel and the water impinges on the turbines housed in the funnel.

Water turbines rotate as water impinges on them.

Wind turbine rotates as wind blows.

A rotational transmission-system system that consists of shafts, sprockets, roller chains, a bevel gear, and one-way clutches transmits the torque produced by water turbines and wind turbine to an alternator. Gear ratios are designed to deliver the requisite rpm to the alternator.

A flywheel attached to the shaft of the alternator enables the maintenance of sustained rpm for the alternator.

A water tight buoyancy chamber provided at the bottom can be emptied of water when needed to produce weight reduction of the unit and thus to enhance maneuverability of the unit in water.

Stabilization tank at the top, when filled with water, provides added weight and stability to resist overturning and sliding of the unit in its operational location.

A frame serves as support structure.

Wheels provided at the bottom facilitate portability of unit on land.

The base unit (when the detachable wind turbine and stabilization tank are detached) has the size of an SUV, and each unit utilizes about 10 feet of width perpendicular to the direction of water flow.

The unit can operate alone or in a group where several units can be linked together to form an energy farm that combines the energies of all units. The uniqueness of the approach lies in low-cost, small-scale operation and large-scale renewable energy production economically.

As an additional benefit, the seawall-like structure of linked units in a wave energy farm will absorb the energy and serve as an energy dissipater to mitigate coastal erosion and to promote coastal restoration.

ADVANTAGES

The apparatus has the versatility to operate in wave-swash zone or in flowing streams.

It harnesses the combined energy of waves and wind when placed in coastal waters.

It harnesses the combined energy of streamflows and wind when placed in a stream.

Portability of the unit on land, its maneuverability in water, and its stability against sliding and overturning in the operational location are some of the key features.

Designed with a detachable wind turbine and a detachable stabilization tank, the base segment of the unit is about the size of an SUV, and individual parts can be transported to operational site in a truck, and then assembled at the site.

The wind turbines are designed in such a way that they rotate in a specified direction regardless of the direction of the wind.

The flywheel attached to the shaft connected to the alternator provides steady angular momentum for the alternator shaft.

The alternator acquires its requisite rpm from the gear system with predetermined gear ratios.

The buoyancy chamber, when emptied of water, enhances the maneuverability of the unit in water.

The stabilization tank, when filled with water, serves to increase the weight, and stability to resist overturning and sliding of the unit in its operational location.

The harnessing of the combined energy in coastal waves and wind as well as the combined energy in streamflows and wind, and the utilization of a combination of water turbines, and wind turbine, complemented by a flywheel result in substantially steady rotation of the alternator shaft and a consequent increase of capacity factor. The apparatus is a self-contained and portable mechanism.

Hydrodynamic calculations show that the invention is technically feasible from the stand point of the availability of wave energy. Wave power $P=\frac{1}{8} (\rho \cdot g \cdot H^2) C$, Watts per meter (W/m) of crest length along the individual crest, where $\rho$=density of sea water=1025 kg/m$^3$, g=acceleration due to gravity=9.8 m/s$^2$, H=height of wave (m), d=depth of water (m), $C=(g \cdot d)^{0.5}$. As an example, consider a wave with wave height H=1.2 meters (4 feet approx.), d=1.5 meters. Then, by the above equation, for a 4 feet (1.2 m) high wave, the power P is about 7 kW per meter of crest length. The power available in a 1.2 meter high wave for the 2.3 meter wide energy harvester is about 16 kW. For waves 5 feet (1.5 m) high, the wave power available for each unit is about 28 kW. Wind power adds to this wave power.

Hydrodynamic calculations show that the invention is technically feasible from the stand point of the availability of streamflow energy. Because of the constriction at the entrance of the pipe, a small rise in stream water level occurs immediately upstream of the units that are arrayed across the stream perpendicular to the flow. The constriction of the pipe causes the flow to converge and the velocity to increase, thereby raising the kinetic head by about five times the original kinetic head in the stream. With the boosted velocity head, water impinges the turbines housed in the pipe. As an example, calculations show that for a stream depth of 8 ft, and stream velocity of 6 ft/s, the estimated power output expected from a unit with the boosted kinetic energy and with an estimated efficiency of 50%, is about 40 kW.

In an energy farm several units are linked together. While each unit operates independently, several units combine their energies to produce substantial quantity of electricity.

As an added benefit, there will be reduced coastal erosion where a wave energy farm is installed. The harnessing of the wave energy results in energy dissipation before the wave strikes the shore. Consequently, when several units are operating side by side, they act monolithically like a sea wall absorbing energy, thereby reducing littoral drift and coastal erosion. Thus, while producing energy, the energy farm in coastal water can also ameliorate coastal erosion.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

Figure 2:
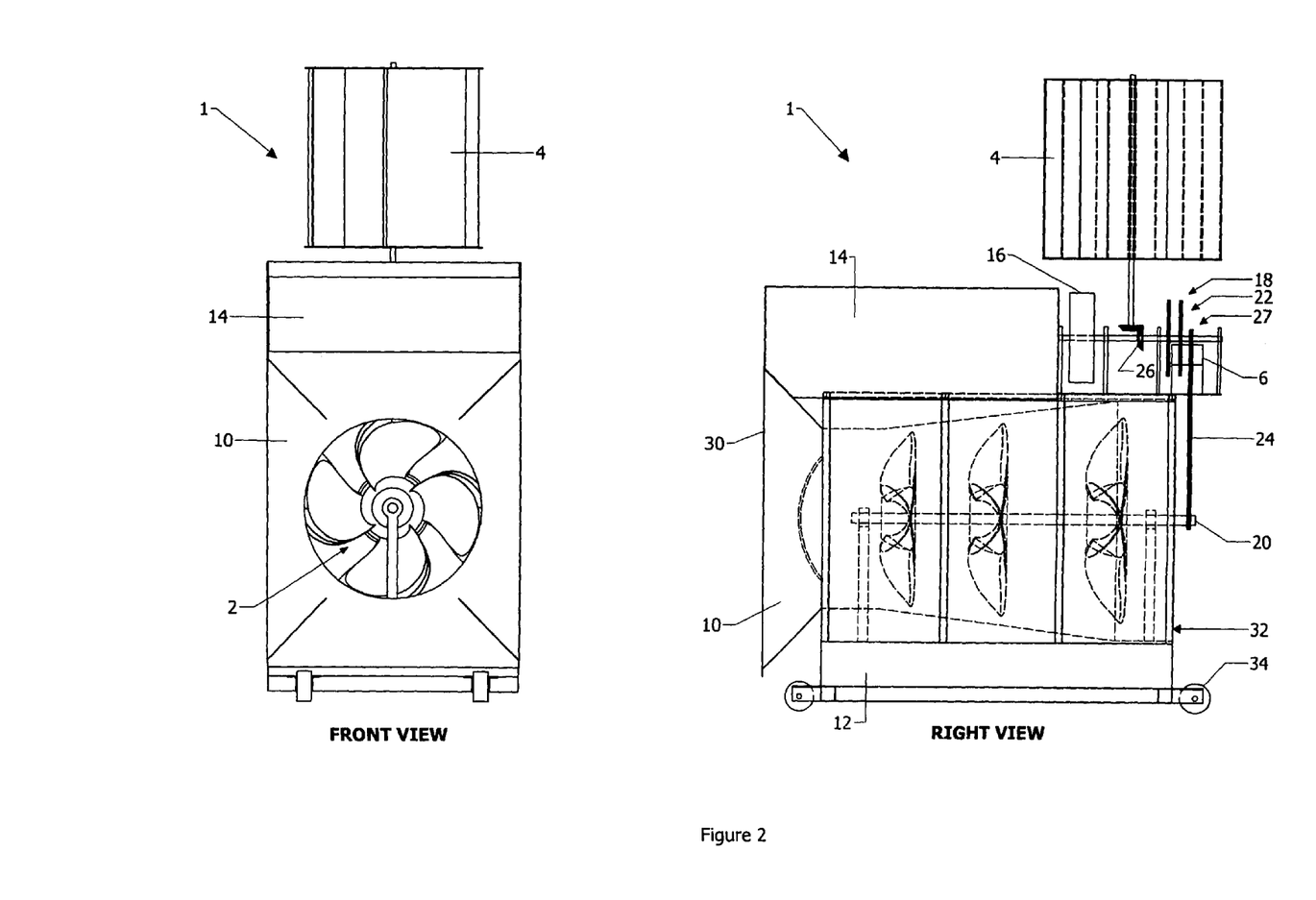
FIG. 2 is a rear view and left view of hydrokinetic & wind energy harvester invention (ref. #1) showing: hydrokinetic & wind energy harvester (ref. #1), water turbines (ref. #2), wind turbine (ref. #4), alternator (ref. #6), pipe (ref. #8), funnel (ref. #10), buoyancy chamber (ref. #12), stabilization tank (ref. #14), flywheel (ref. #16), rotational transmission-system (ref. #18), shafts (ref. #20), sprockets (ref. #22), roller chains (ref. #24), bevel gear (ref. #26), one-way clutches (ref. #27), trash guard (ref. #30), frame (ref. #32), and wheels (ref. #34).
Figure 3:
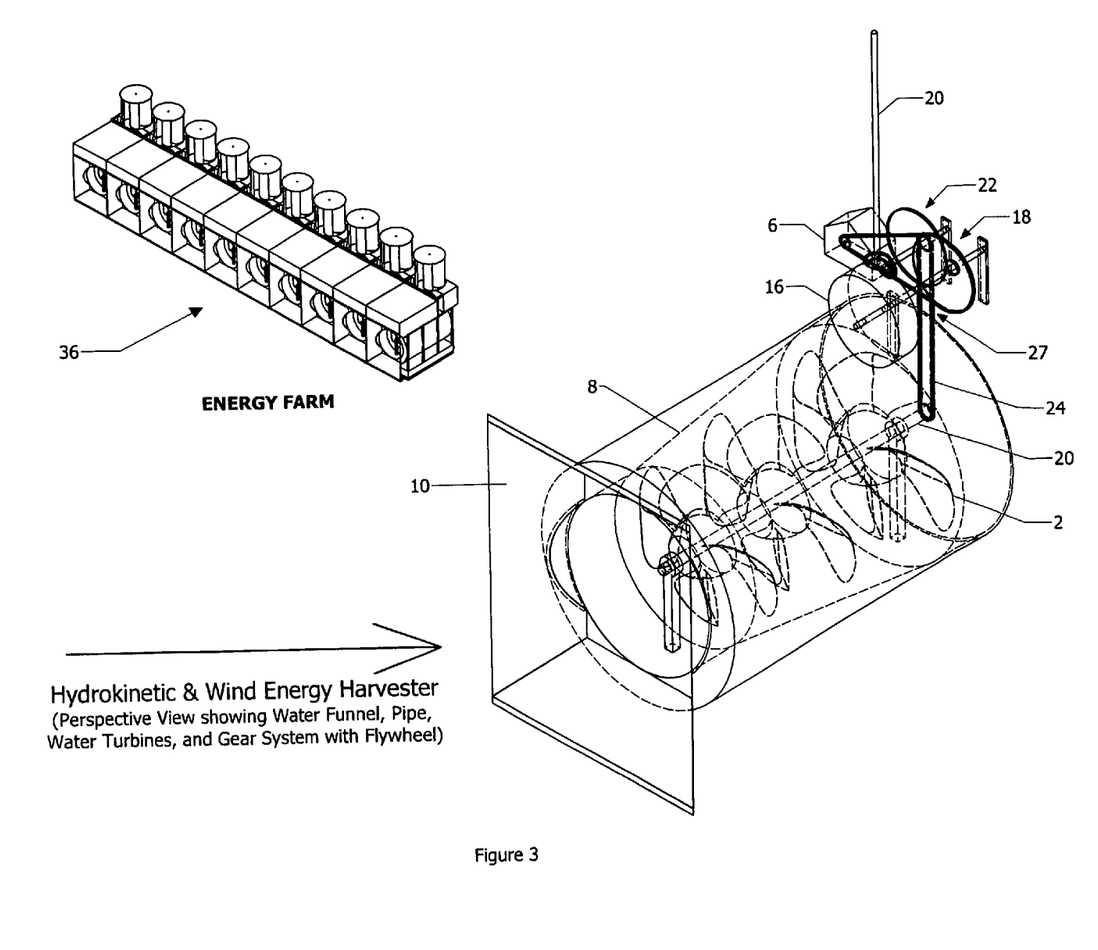
FIG. 3 is an isometric view of part of the hydrokinetic & wind energy harvester invention (ref. #1) showing: water turbines (ref. #2), alternator (ref. #6), pipe (ref. #8), funnel (ref. #10), flywheel (ref. #16), rotational transmission-system (ref. #18), shafts (ref. #20), sprockets (ref. #22), roller chains (ref. #24), one-way clutches (ref. #27), and energy farm (ref. #36).

REFERENCE NUMBERS AND NAMES 1 hydrokinetic & wind energy harvester invention (FIG. 1, FIG. 2, FIG. 4, FIG. 5, FIG. 6)
2 water turbines (FIG. 1, FIG. 2, FIG. 3)
4 wind turbine (FIG. 1, FIG. 2)
6 alternator (FIG. 1, FIG. 2, FIG. 3)
8 pipe (FIG. 1, FIG. 2, FIG. 3)
10 funnel (FIG. 1, FIG. 2, FIG. 3)
12 buoyancy chamber (FIG. 1, FIG. 2)
14 stabilization tank (FIG. 1, FIG. 2)
16 flywheel (FIG. 1, FIG. 2, FIG. 3)
18 rotational transmission-system (FIG. 1, FIG. 2, FIG. 3)
20 shafts (FIG. 1, FIG. 2, FIG. 3)
22 sprockets (FIG. 1, FIG. 2, FIG. 3)
24 roller chains (FIG. 1, FIG. 2, FIG. 3)
26 bevel gear (FIG. 1, FIG. 2)
27 one-way clutches (FIG. 2, FIG. 3)
28 transmission-system cover (FIG. 1)
30 trash guard (FIG. 1, FIG. 2)
32 frame (FIG. 1, FIG. 2)
34 wheels (FIG. 1, FIG. 2)
36 energy farm (FIG. 3)

DESCRIPTION OF THE PREFERRED EMBODIMENT

Figure 1:
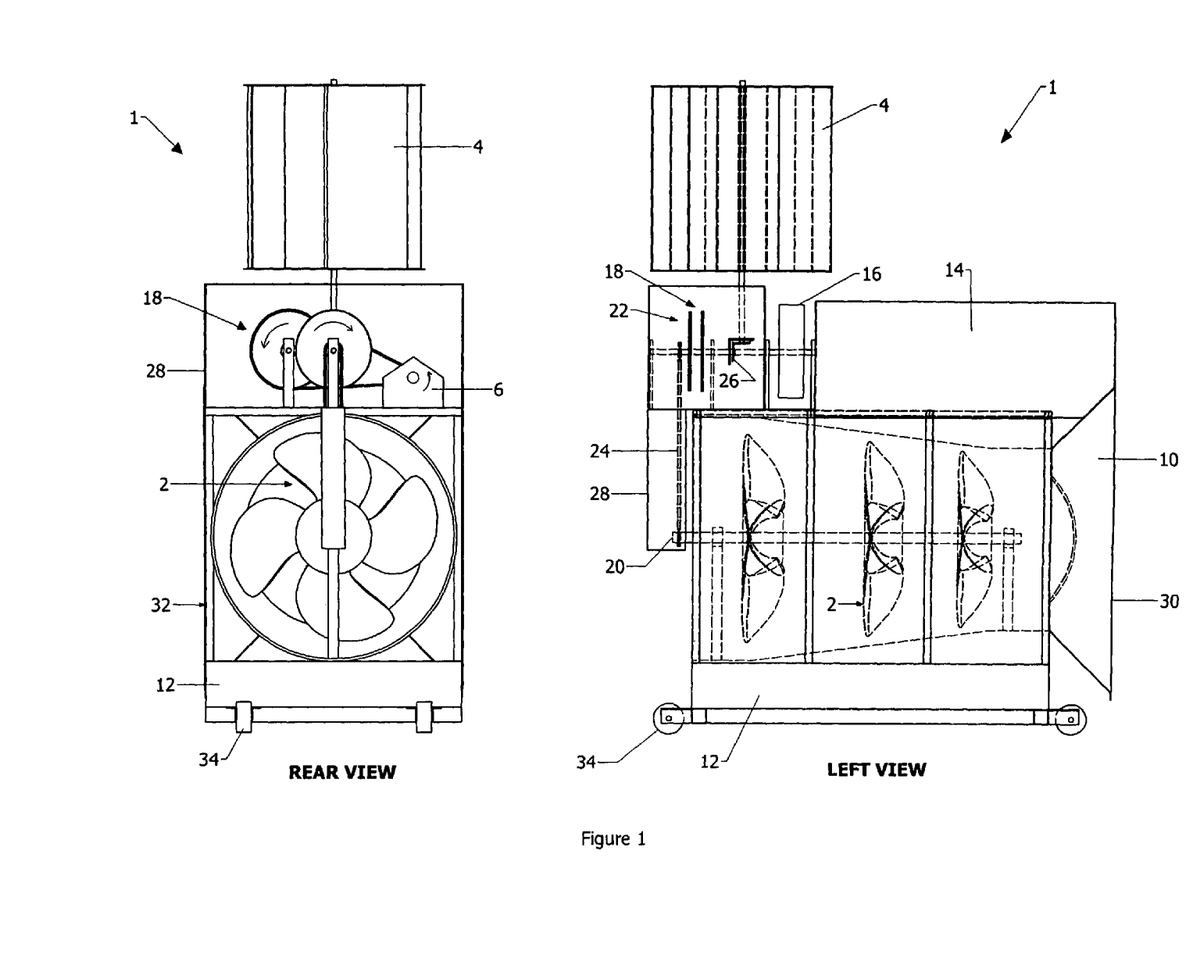
FIG. 1 is a rear view and left view of hydrokinetic & wind energy harvester invention (ref. #1) showing: hydrokinetic & wind energy harvester (ref. #1), water turbines (ref. #2), wind turbine (ref. #4), alternator (ref. #6), pipe (ref. #8), funnel (ref. #10), buoyancy chamber (ref. #12), stabilization tank (ref. #14), flywheel (ref. #16), rotational transmission-system (ref. #18), shafts (ref. #20), sprockets (ref. #22), roller chains (ref. #24), bevel gear (ref. #26), transmission-system cover (ref. #28), trash guard (ref. #30), frame (ref. #32), and wheels (ref. #34).

Water turbines 2 having horizontal axes, rotatably mounted on one of the shafts 20, are housed in pipe 8.

Wind turbine 4, detachably and rotatably mounted on frame 32, have vertical axes and they are located above stabilization tank 14.

Alternator 6, housed on frame 32, having one of the shafts rotatably linked to roller chains 24.

Pipe 8, rigidly mounted on frame 32, having a large end and a small end, houses water turbines 2.

Funnel 10, rigidly mounted on frame 32, having a large end and a small end, with its small end rigidly fixed to the small end of pipe 8.

Buoyancy chamber 12, rigidly mounted on frame 32, is a hermetically sealed container located at the bottom of the hydrokinetic & wind energy harvester 1.

Stabilization tank 14, detachably mounted on frame 32, is a water-tight container, located above the top of water turbines 2.

Flywheel 16, rigidly mounted on one of the shafts 20, is a heavy circular disk of predetermined weight and diameter.

Rotational transmission-system 18, mounted on frame 32, comprises flywheel 16, shafts 20, sprockets 22, roller chains 24, bevel gear 26, one-way clutches 27, and transmission-system cover 28.

Shafts 20, rotatably mounted on frame 32, carry water turbines 2, wind turbine 4, and sprockets 22.

Sprockets 22, attached to shafts 20, are circular in shape and have predetermined diameters.

Roller chains 24 are linked to sprockets 22.

Bevel gear 26 are attached to one of the shafts 20 connected to wind turbine 4.

One-way clutches 27 are attached to shafts 20.

Transmission-system cover 28 encloses the rotational transmission-system 18.

Trash guard 30 is rigidly attached to the larger end of the funnel 8.

Frame 32 mounted on wheels 34, is a support structure for all component parts which comprise water turbines 2, wind turbine 4, alternator 6, pipe 8, funnel 10, buoyancy chamber 12, stabilization tank 14, flywheel 16, rotational transmission-system 18, shafts 20, sprockets 22, roller chains 24, bevel gear 26, one-way clutches 27, transmission-system cover 28, trash guard 30, frame 32, and wheels 34.

Wheels 34, are rotatably attached to frame 32.

Energy farm 36, link group of hydrokinetic & wind energy harvester 1.

In Operation,

Water turbines 2 rotate in predetermined directions about horizontal axes due to force of waves in wave-swash or due to force of water flowing in a stream impinging on water turbines 2. The rotational energy of water turbines 2 is transmitted to one of the shafts 20 connected to the rotational transmission-system 18.

Wind turbine 4 rotate about a vertical axis due to the force of wind blowing on wind turbine 4. By virtue of the curved shape of the blades of the wind turbine 4, the wind turbine 4 rotates in a predetermined direction regardless of the direction of the wind. The rotational energy of wind turbine 4 is transmitted to one of the shafts 20 through bevel gear 26.

Alternator 6 converts mechanical energy into electrical energy. The rotational energy generated by water turbines 2, and by wind turbine 4 is transmitted to the alternator 6 through a rotational transmission-system 18.

Pipe 8 serves to confine the water flow and to direct water toward the water turbines 2 housed in pipe 8. The narrow end of pipe 8 receives water from the narrow end of funnel 10, where velocity of water increases thereby boosts the velocity head with which water strikes water turbines 2.

Funnel 10 serves to receive flowing water through the large end of funnel 10 and to guide and converge water through the narrow funnel 10 toward the narrow end of pipe 8 where, due to the reduction in the area of cross section of the flow, water accelerates (continuity equation) and impinges on the water turbines 2 with the boosted velocity head.

Buoyancy chamber 12 at the bottom can hold water. By pumping water into it, the weight of hydrokinetic & wind energy harvester 1 can be increased, and by pumping water out of it the weight of the unit can be reduced. When the unit has to be moved in water, to improve maneuverability, buoyancy chamber 12 can be emptied to reduce the weight of the unit. On the other hand, once the apparatus is placed in the operational location for operation, the unit can gain more self-weight and hence more stability by filling buoyancy chamber 12 with water.

Stabilization tank 14 at the top of the hydrokinetic & wind energy harvester 1 can hold water. Once the unit is placed in its operational location the weight and thereby stability against sliding and overturning can be increased by filling stabilization tank 14. On the other hand, when the apparatus has to be moved out of the operational location, water can be drained from the stabilization tank 14 to reduce the weight of the unit and thereby to enhance maneuverability of the unit.

Flywheel 16 rotates and carries angular momentum derived from the torque generated by the water turbines 2 and wind turbine 4 to sustain steady rotation of one of the shafts 20 on which the flywheel 16 is mounted. Flywheel 16 absorbs energy and then releases energy steadily. The energy released steadily from the flywheel 16 is transmitted to alternator 6.

Rotational transmission-system 18 conveys torque generated by the action of water turbines 2 and wind turbine 4 to alternator 6.

Shafts 20 rotate together with their attached sprockets 22 and flywheel 16.

Sprockets 22 serve to transmit torque to alternator 6 through roller chains 24. Predetermined ratios of the diameters of sprockets 22 dictate and provide requisite rpm for alternator 6.

Roller chains 24 transmit the torque from sprockets 22 to the alternator 6.

Bevel gear 26 effects a change of direction of rotation of one of the shafts 20 connected to wind turbine 4 by 90 degrees.

One-way clutches 27 serve to transmit torque to shafts 20 in only one direction toward alternator 6 while suppressing torque in the other direction.

Transmission-system cover 28 enveloping the rotational transmission-system 18 serves to provide a water-tight enclosure for the rotational transmission-system 18.

Trash guard 30 prevents trash and aquatic animals from entering the pipe 8.

Frame 32 serves as a support structure for the components of the unit.

Wheels 34 serve to facilitate rolling of the unit on land.

Energy farm 36 links together a group of hydrokinetic & wind energy harvester 1 and combines energies of all units.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. While above description contains many specifications, these should not be considered as limitations on the scope, but rather as an exemplification. Many other variations are possible. For example, the direction of axes and the configuration of water turbines as well as of wind turbine shown in this example can be altered to optimize performance of the hydrokinetic & wind energy harvester. Accordingly, the scope should be determined not by the embodiments illustrated, but by the appended claims and their legal equivalents.

Having thus described the invention, what is desired to be protected by Letters Patent is presented in the subsequently appended claims.

REFERENCE NUMBERS IDENTIFIED IN
INDICATED FIGURE NUMBERS OF
HYDROKINETIC & WIND ENERGY
HARVESTER INVENTION

Figure 4:
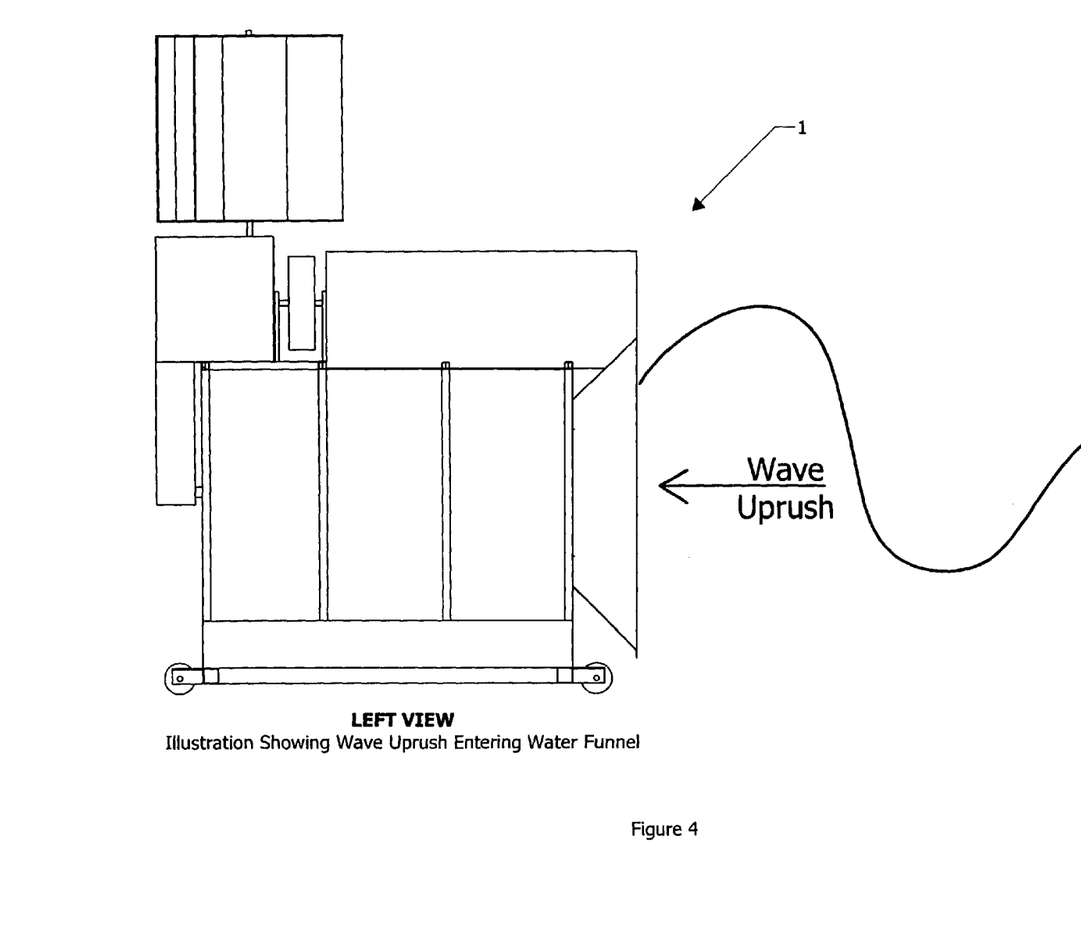
FIG. 4 is a left view of hydrokinetic & wind energy harvester Invention (ref. #1) placed in wave uprush showing wave uprush impinging on it, thereby transferring mechanical energy of waves to hydrokinetic & wind energy harvester.
Figure 5:
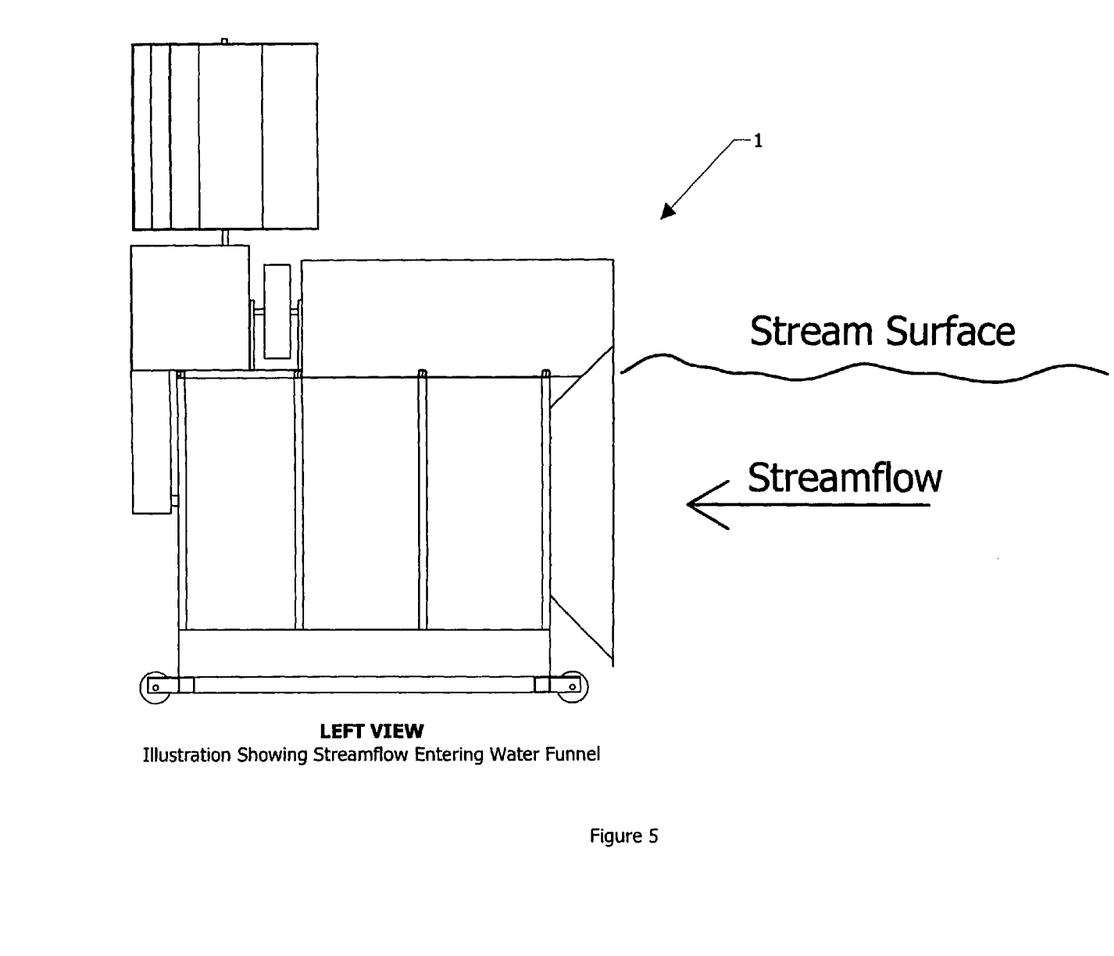
FIG. 5 is a left view of hydrokinetic & wind energy harvester (ref. #1) placed in streamflow showing streamflow acting on it, thereby transferring mechanical energy of streamflow to hydrokinetic & wind energy harvester.
Figure 6:
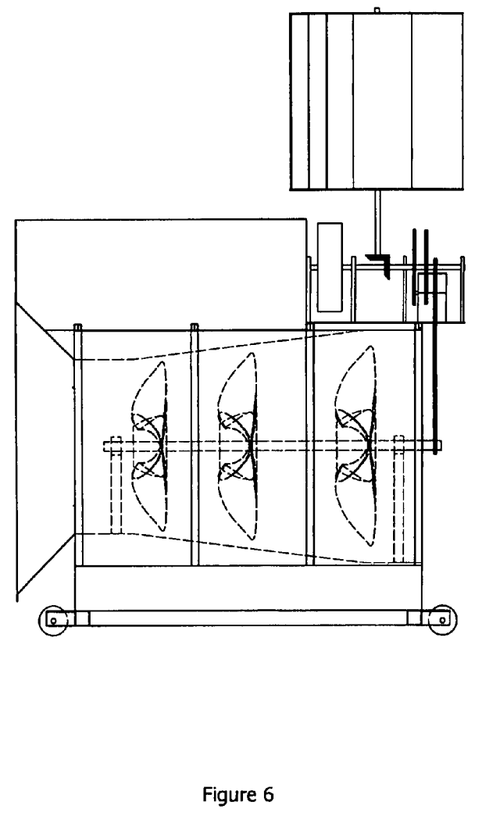
FIG. 6 is a right view of hydrokinetic & wind energy harvester invention showing another assembly of hydrokinetic & wind energy harvester as a whole.

| Reference Number and Name | FIG. 1 | FIG. 2 | FIG. 3 | FIG. 4 | FIG. 5 | FIG. 6 |
|---|---|---|---|---|---|---|
| 1. hydrokinetic & wind energy harvester | x | x |  | x | x | x |
| 2. water turbines | x | x | x |  |  |  |
| 4. wind turbine | x | x |  |  |  |  |
| 6. alternator | x | x | x |  |  |  |
| 8. pipe | x | x | x |  |  |  |
| 10. funnel | x | x | x |  |  |  |
| 12. buoyancy chamber | x | x |  |  |  |  |
| 14. stabilization tank | x | x |  |  |  |  |
| 16. flywheel | x | x | x |  |  |  |
| 18. rotational transmission-system | x | x | x |  |  |  |
| 20. shafts | x | x | x |  |  |  |
| 22. sprockets | x | x | x |  |  |  |
| 24. roller chains | x | x | x |  |  |  |
| 26. bevel gear | x | x |  |  |  |  |
| 27. one-way clutches |  | x | x |  |  |  |
| 28. transmission-system cover | x |  |  |  |  |  |
| 30. trash guard | x | x |  |  |  |  |
| 32. frame | x | x |  |  |  |  |
| 34. wheels | x | x |  |  |  |  |
| 36. energy farm |  |  |  | x |  |  |

What is claimed is:

1. A hydrokinetic & wind energy harvester for capturing mechanical energy contained in coastal waves and in wind, as well as in streamflows and in wind through the utilization of a combination of water turbines and wind turbines to produce electrical energy in an alternator, comprising:
   a frame;
   means, rotatably mounted on said frame, for producing rotational energy through reaction to force of said coastal waves or of said streamflows;
   means, rigidly mounted on said frame, for confining flowing water;
   means, rigidly mounted on said frame, for guiding and converging said coastal waves or said streamflows;
   means, rotatably mounted on said frame, for producing said rotational energy by reaction to force of said wind;
   means, housed in said frame, for transmitting said rotational energy through the reaction to the force of said coastal waves, or of said streamflows, and said rotational energy through the reaction to force of said wind;
   means, mounted on said frame, for providing a watertight enclosure;
   means, rotatably mounted on said frame, comprising of at least one disk, for retaining angular momentum;

means, rigidly mounted on said frame, comprising at least one airtight bottom-tank that can be emptied of water, for reducing weight and for enhancing maneuverability of said hydrokinetic & wind energy harvester in water;

means, rigidly mounted on said frame, comprising at least one watertight overhead-tank, that can be filled with water for increasing weight and stability of said hydrokinetic & wind energy harvester;

means, rotatably fitted on said frame, for enabling said hydrokinetic & wind energy harvester to roll along a surface.

2. The hydrokinetic & wind energy harvester in accordance with claim 1, wherein said means for producing said rotational energy through the reaction to force of said coastal waves or of said streamflows comprises said water turbines.

3. The hydrokinetic & wind energy harvester in accordance with claim 1, wherein said means for confining flowing water comprises pipe.

4. The hydrokinetic & wind energy harvester in accordance with claim 1, wherein said means for guiding and converging said coastal waves or said streamflows comprises funnel.

5. The hydrokinetic & wind energy harvester in accordance with claim 1, wherein said means for producing said rotational energy by the reaction to the force of said wind comprises said wind turbines.

6. The hydrokinetic & wind energy harvester in accordance with claim 1, wherein said means for transmitting said rotational energy through the reaction to the force of said coastal waves, or of said streamflows, and said rotational energy through the reaction to force of said wind comprises a rotational transmission-system having shafts, sprockets, roller chains, bevel gears, one-way clutches, and a transmission-system cover.

7. The hydrokinetic & wind energy harvester in accordance with claim 6, further comprising means for dictating rates of rotation of said shafts thereby producing predetermined revolutions per minute for said alternator comprises said sprockets, and said roller chains.

8. The hydrokinetic & wind energy harvester in accordance with claim 6, further comprising means for changing the direction of axes of rotation from those of said wind turbines by 90 degrees comprises said bevel gears.

9. The hydrokinetic & wind energy harvester in accordance with claim 6, further comprising means for transmitting torque generated in said shafts in only one direction toward said alternator while suspending said torque in the other direction comprises said one-way clutches.

10. The hydrokinetic & wind energy harvester in accordance with claim 6, wherein said means for providing said watertight enclosure for said rotational a transmission-system comprises transmission-system cover.

11. The hydrokinetic & wind energy harvester in accordance with claim 1, wherein said means for retaining said angular momentum comprises flywheels.

12. The hydrokinetic & wind energy harvester in accordance with claim 1, wherein said means comprising at least one of said airtight bottom-tank that can be emptied of water for reducing weight and for enhancing said maneuverability of said hydrokinetic & wind energy harvester in water comprises buoyancy chambers.

13. The hydrokinetic & wind energy harvester in accordance with claim 1, wherein said means comprising at least one of said watertight overhead-tank that can be filled with water for increasing the weight and stability of said hydrokinetic & wind energy harvester comprises stabilization tanks.

14. The hydrokinetic & wind energy harvester in accordance with claim 1, wherein said means for enabling said hydrokinetic & wind energy harvester to roll along a surface comprises wheels.

15. A hydrokinetic & wind energy harvester for capturing mechanical energy contained in coastal waves or in streamflows and in wind to produce electrical energy in an alternator, and for forming an energy farm on a sea coast, comprising:

a frame;

plurality of water turbines rotatably mounted on said frame, said water turbines producing rotation caused by force of said coastal waves or by force of said streamflows impinging on said water turbines, thereby generating energy;

plurality of wind turbines detachably and rotatably mounted on said frame, said wind turbines producing rotation caused by force of said wind that blows on said wind turbines, thereby generating energy;

a rotational transmission-system housed in said frame, comprising a plurality of shafts, sprockets, roller chains, bevel gears, one-way clutches, and transmission system cover, for conveying torque generated by the action of said water turbines, and of said wind turbines to said alternator;

said bevel gears rotatably coupled to said shafts, for changing the direction of the axes of rotation from that of said wind turbines by 90 degrees;

said one-way clutches rotatably coupled to said shafts, for transmitting said torque in said shafts to said alternator in only one direction toward said alternator while suspending said torque in the other direction;

plurality of flywheels rigidly attached to said shafts, for retaining angular momentum of said shafts thereby maintaining substantially steady rotation of said shafts of said alternator;

at least one buoyancy chamber fitted rigidly at the bottom of said frame, having at least one hermetically sealed water tank that can be emptied of water, for reducing the weight of said hydrokinetic & wind energy harvester by pumping said water out of said buoyancy chamber, thereby enhancing maneuverability of said hydrokinetic & wind energy harvester in water;

a plurality of stabilization tanks detachably mounted on said frame above said water turbines, comprising at least one watertight overhead tank that can be filled with water, for increasing weight and stability of said hydrokinetic & wind energy harvester;

wheels rotatably connected to said frame, for enabling said hydrokinetic & wind energy harvester to roll along a surface.

16. Said energy farm comprising a plurality of said hydrokinetic & wind energy harvester as recited in claim 15 linked together, thereby combining said electrical energy produced by a group of said hydrokinetic & wind energy harvester.

17. Said energy farm, recited in claim 16, comprising a plurality of said hydrokinetic & wind energy harvester arrayed along said sea coast, forming a seawall-like barrier for acting as an energy dissipater, whereby reducing coastal erosion of said sea coast.

* * * * *